United States Patent [19]

Chi

[11] 4,251,591
[45] Feb. 17, 1981

[54] POLYVINYLBUTYRAL LAMINATES

[75] Inventor: Henry K. Chi, Longmeadow, Mass.

[73] Assignee: Monsanto Company, St. Louis, Mo.

[21] Appl. No.: 80,645

[22] Filed: Oct. 1, 1979

[51] Int. Cl.³ .................... B32B 5/18; B32B 27/08
[52] U.S. Cl. .................... 428/315; 428/297;
428/412; 428/437; 428/442; 428/463;
428/476.9; 428/480; 428/483; 428/501;
428/520; 428/521; 428/527
[58] Field of Search ............... 428/437, 527, 501, 315,
428/520, 521, 412, 480, 483, 476.9, 463, 297, 442

[56] References Cited

U.S. PATENT DOCUMENTS

| | | | |
|---|---|---|---|
| 2,430,931 | 11/1947 | Hershberger | 428/501 |
| 2,955,054 | 10/1960 | Park | 428/501 |
| 2,991,199 | 7/1961 | Park | 428/501 |
| 3,030,229 | 4/1962 | Esswein, Jr. | 428/501 |
| 3,421,928 | 1/1969 | Ramsey | 428/501 |
| 3,471,356 | 10/1969 | Kolb | 428/315 |
| 3,488,714 | 1/1970 | Walters | 428/315 |
| 3,650,803 | 3/1972 | Lin | 428/463 |
| 4,027,061 | 5/1977 | Cartier | 428/437 |
| 4,115,622 | 9/1978 | Cartier | 428/426 |
| 4,126,601 | 11/1978 | Cartier | 428/426 |
| 4,164,602 | 8/1979 | Fabel | 428/412 |
| 4,188,440 | 2/1980 | Doerer | 428/315 |

FOREIGN PATENT DOCUMENTS 1218321 1/1971 United Kingdom .
1354907 5/1974 United Kingdom .

*Primary Examiner*—Ellis P. Robinson
*Attorney, Agent, or Firm*—David Bennett; William J. Farrington; Edward P. Grattan

[57] ABSTRACT

Laminates of a polyvinyl butyral sheet with a sheet comprising a copolymer of a vinylaromatic monomer with an unsaturated dicarboxylic acid anhydride have high strength and can be made optically clear. The laminates can be in part foamed to provide insulation materials or metalplated to provide tough materials that could be used for example in automotive applications.

16 Claims, No Drawings

POLYVINYLBUTYRAL LAMINATES

BACKGROUND OF THE INVENTION

This invention relates to laminates and specifically to laminates comprising laminated sheets of a polyvinylbutyral and a thermoplastic copolymer. Laminates of this type are typically used as glass replacements for a specific range of end uses. The laminates of the present invention are useful in these applications and in the areas where transparency is not required.

The laminates herein described have distinctly advantageous properties making them suitable for a wide range of uses as hereinafter explained. They are characterized by excellent adhesion between the two layers without the need for complex lamination procedures or costly adhesion promoting additives and in this they distinctly differ from other laminates of the same general type that have been heretofore proposed.

DISCUSSION OF THE PRIOR ART

Polyvinylbutyral [PVB] has been very widely used as an interlayer in optical laminates. Indeed the vast majority of laminated windshields in cars are made with a PVB interlayer. In such cases the PVB interlayer is laminated between glass sheets.

In a move to reduce weight there have been many proposals for replacing the inboard glass layer of a car windshield with a plastic material.

Thus optical laminates (known conventionally as bilayers) can comprise PVB bonded to, for example, polyester (British Pat. No. 1,438,779); amorphous polyamide (U.S. Pat. No. 3,916,074); polyurethane (British Pat. No. 1,436,884); polymethylmethacrylate (U.S. Pat. No. 3,625,792); polyvinyl fluoride, polyvinylidene chloride, cellulose acetate, or "Surlyn A" (U.S. Pat. No. 3,781,184); cellulose esters (U.S. Pat. No. 3,762,981); a high nitrile barrier polymer (U.S. Pat. No. 4,027,061); and polycarbonates (U.S. Pat. No. 3,406,086).

One of the problems with many of the above laminated structures is that the adhesion between the PVB and the plastic sheet is often only mediocre such that it has proved necessary to treat the surfaces with an adhesion promoting material or to use rigorous laminating conditions to achieve an adequate bond.

In addition many of the plastics are so flexible that, if the PVB is laminated between two such plastic sheets, the resulting laminate is not sufficiently rigid for glazing purposes.

Copolymers of a vinyl aromatic monomer, such as styrene, with an unsaturated dicarboxylic acid anhydride, such as maleic anhydride, (called SMA copolymers for convenience), are well known and have been used to produce laminates with styrene polymers such as ABS, high impact polystyrene and styrene/acrylonitrile polymers (British Pat. No. 1,354,907).

However such laminates are of little utility as optical laminates since, even if they are made transparent by known refractive index matching techniques, they are subject to brittle fracture upon fairly moderate impacts if they are reduced to typical glazing thicknesses. They also have deficiencies where the intended use is not the optical field since they lack toughness and resistance to penetration at low thicknesses.

BRIEF DESCRIPTION OF THE INVENTION

The present invention provides a laminate comprising (A) at least one sheet comprising a copolymer formed by polymerizing from 55 to 97 parts by weight of a vinyl aromatic monomer with from 3 to 45 parts by weight of an unsaturated dicarboxylic acid anhydride and from 0 to 20 parts by weight of a copolymerizable monomer; laminated to (B) a sheet of polyvinyl butyral.

Component A of the laminate can be formed of a copolymer comprising up to 20 and preferably from 5 to 15 percent by weight of a copolymerizable monomer selected from $C_1$ to $C_3$ alkyl methacrylate esters and unsaturated nitriles such as acrylonitrile and methacrylonitrile.

The copolymer can also be formed by polymerization of the monomers in the presence of from 2 to 30 percent by weight (based on the total weight of the rubber-modified copolymer) of a rubber having a glass transition temperature below 0° C. Of course if the sheet is to be transparent care must be taken to provide that the rubber and graft levels are such that the refractive index of the dispersed rubber particles is not greatly different from that of the copolymer matrix in which the particles are dispersed. This technique is described in for example British Pat. No. 1,218,321.

The vinyl aromatic monomer of component A can be any aromatic monomer having attached thereto a substituted or unsubstituted vinyl radical. The preferred monomer is styrene but also included are α-methylstyrene, chlorostyrene, ortho- or para-vinyl toluene and similar ring- or side chain-substituted compounds. Preferred copolymers comprise from 55 to 85% by weight of the vinylaromatic monomer.

The unsaturated dicarboxylic acid anhydride is preferably maleic anhydride but other monomers of this type such as citraconic anhydride, itaconic anhydride and aconitic anhydride can also be used. Preferred copolymers comprise from 15 to 30% by weight of the anhydride component.

The rubber component, where one is present, has a glass transition temperature below 0° C. and preferably below −30° C. It is important, if the laminate must be transparent, that in the final polymer the refractive indices of the grafted rubber and the matrix match. With that constraint the rubber can be selected from known rubbers such as polyisoprene, polybutadiene, copolymers of at least 60 percent by weight of butadiene with copolymerizable monomers such as styrene and acrylonitrile, EPDM rubbers, polychloroprene, polypentenamer and the like.

The proportion of rubber in the component can be as high as 30 percent by weight but when present it is usually from 5 to 20 percent of the weight of component A.

Component A, in addition to the SMA polymer described above, can comprise a further polymer blended with the SMA to confer specific advantages. For example a blend of from 30 to 95 percent by weight of SMA with a copolymer of styrene and acrylonitrile (80–20% Styrene, 20–80% acrylonitrile) has improved tensile strength and UV stability over the same SMA alone. Other polymers that can be blended with the SMA polymer include rubber-modified polystyrene, an MBS-type polymer (for example a diene rubber grafted with methyl methacrylate and styrene); polyphenylene oxides, polycarbonates, polyamides and polyesters.

Care must be taken to ensure that where strength and clarity are significant considerations, the polymer blended with the SMA is compatible therewith. It is found for example that the higher levels of maleic anhydride within the permitted range require the blended polymer to have a higher proportion of the acrylonitrile component to achieve compatibility. Also rubber-modified polystyrene is only compatible at maleic anhydride levels below about 12%.

It is often advantageous to provide that polymer blended with the SMA (or rubber-modified SMA) is ABS. The term "ABS" is used in the conventional sense to indicate a diene rubber substrate grafted with styrene and acrylonitrile and dispersed in a matrix of a styrene/acrylonitrile copolymer and includes those polymers in which the styrene is wholly or partially replaced by α-methylstyrene or chlorostyrene and the like, and the acrylonitrile is wholly or partially replaced by methacrylonitrile.

It is also within the purview of this invention to provide that component A of the laminate be a foamed material. Laminae comprising SMA foams and a polyvinylbutyral sheet have surprising toughness and impact resistance making them particularly useful for home insulation uses.

Component A can also incorporate a mineral reinforcing agent such as glass fiber, absestos fibers or other fibrous reinforcing material or alternatively of the various nonfibrous, abrasive mineral particles that are commercially available for such purposes. In some cases the inclusion of such reinforcement may require the use of an adhesion promoter, such as air aminosilane derivative, to achieve results. Component B of the laminate, the PVB sheet is conveniently of the type used to produce automobile windshield interlayers. The PVB usually comprises from 10 to 30 percent and preferably 15–25 percent by weight of hydroxyl groups (measured as polyvinyl alcohol) and up to 10 percent, usually less than 5 percent, of acetate groups measured as polyvinylacetate. The PVB most frequently contains a plasticizer to render the polymer more tractable. There are many suitable plasticizers that are well known in the art and some of the most suitable include, alkyl adipates such as dihexyl adipate, triethylene glycol di-2ethyl butyrate, glycerol triricinoleate, dibutyl sebacate, alkyl sulfonamides, trialkyl phosphates, and phthalates such as dibutyl phthalates and butyl benzyl phthalate. Besides such additives the PVB layer can comprise a UV stabilizer, a pigment or die, and antioxidant, a flame retardant and other additives conferring specific benefits on the layer or the laminate.

Often component B of the laminate, the PVB sheet, is sandwiched between two sheets of component A though this is not necessary as, for many purposes, it may be preferred to laminate one face to a different component such as glass, a different polymeric material, a fabric or a metal sheet.

The laminates of the invention, in addition to components A and B can comprise other laminae intended to confer specific advantages on the final product. Besides providing for two or more sheets of either or both of A and B, (of the same or different compositions), the laminate may comprise other layers of for example glass, glass fiber sheets, polycarbonates, polyamides, polyesters such as polyethylene terephthalate, polysulfones, polyether sulfones, polysulfides, copolymers of acrylonitrile with styrene or an acrylate, ABS, HIPS alone or in blends with polyphenylene oxide, and polymethyl methacryate. If an ABS sheet is used this can be readily metalplated to obtain a laminate with great toughness and a high finish suitable for a variety of automotive applications for example.

In addition where the laminates of the invention are to be used as bilayers for glazing purposes it is convenient to coat the outside surface of the SMA layer with an abrasion resistant coating. Some of the more efficient of such coatings comprise a hydrolyzed silicate ester and these are found to be very effective with bilayers according to the present invention. Particularly preferred abrasion resistant coatings include those described in U.S. Pat. Nos. 4,126,601; 4,115,622; and U.S. application Ser. No. 840,344 which are incorporated herein by reference.

The permitted thickness of the laminae varies with the type of structure intended. Where an optical laminate is required the individual laminae usually have a thickness of from 0.25 to 2.5 mm and more frequently from 0.50 to 1.55 mm.

The PVB layer usually remains in the above range for all laminates since an adequate degree of toughness is achieved at relatively small thicknesses. The SMA layer may have a thickness, for non-optical laminates, of up to 2 or more centimeters especially where the layer is foamed. For non-foamed, non-optical laminates however a smaller thickness such as from 1 to 10 mm is more usualy.

As has been indicated above one of the chief advantages of SMA is that it adheres easily and strongly to PVB while being itself a rigid sturdy polymer. It is therefore within the contemplation of this invention that the main functions of the SMA layer are to render the PVB layer more easily bonded to a subsequent layer such as a polycarbonate or a copolymer of styrene and acrylonitrile (SAN).

Though the bonding is very efficient it is foreseen that in some cases it might be advantageous to improve the bonding even further by the use of an adhesion promoting layer intermediate the PVB layer and SMA layer. Among the many possible compositions that might be used aminosilane derivatives such as a γ-aminopropyl triethoxy silane or a polyaminofunctional silane.

Such structures are often highly desirable especially in the field of optical laminates since it is recognized that SMA polymers often need special additives to protect them against ultraviolet light. If the layer laminated to the SMA layer has a natural high UV resistance, such as an SAN copolymer, the need for the incorporation of such additives in the SMA layer may be reduced.

The laminates of the invention, where transparency is not required, can be metalplated. The plating can be done on the SMA layer but generally, it is preferred to take advantage of the well-known and excellent plating characteristics of a polymer like ABS by laminating an ABS sheet to the SMA sheet and applying the metalplating to the exposed surface of the ABS sheet. It should be noted that ABS is difficult to heat laminate directly to PVB because of the chemical incompatibility of the components. Both however heat laminate readily with SMA.

The laminate of the invention can of course form a sub-laminate component of a multilayer structure comprising in addition laminae of for example glass fiber cloth, metal foil, thermoplastic sheet materials, facing materials and the like. The permutations are many and are dictated only by the desired properties of the finished product.

One of the more unexpected advantages of SMA as a laminate component is that the lamina can be cut to shape very easily using a power or hand-saw. Normally styrenic polymers without substantial rubber modification tend to be too brittle to allow a clean saw-cut using conventional handyman tools. The SMA however cuts readily without substantial blemishes on either side of the line of the cut.

The laminate of the invention can be formed by conventional techniques such as by compression molding or by co-extrusion or by extrusion of one component into contact with a preformed sheet of the other component.

ILLUSTRATIONS OF PREFERRED EMBODIMENTS

The invention is illustrated further by the following Examples which are for the purposes of illustration only and are not intended to imply any limitation on the scope of the invention.

In each case the SMA layer (used here generically to cover, in addition to polymer of styrene and maleic anhydride, terpolymers of these with a copolymerizable monomer and rubber-modified versions of the same) was compression-molded from polymer pellets at 232° C. and 422 kg/sq.cm. for five minutes and thereafter flash cooled.

The laminates were formed by compression-molding at 107° C. and 70.3 kg/sq.cm. (except where foams were involved when only contact pressure was used) for a period of five minutes. These conditions were selected to ensure good surface/surface contact and to ensure that the PVB sheet did not become too fluid and was not squeezed out of the laminate by the pressure applied.

The sheets laminated in the Examples are identified by the following abbreviations for convenience.

SMA-(I)—78% Styrene, 22% Maleic Anhydride with an intrinsic viscosity at 25° C. of 0.5.

SMA(T)—71% Styrene, 22% Maleic anhydride, 7% methyl methacrylate with an intrinsic viscosity at 25° C. of 0.5 to 0.7.

RM-SMA—SMA-(I) polymerized in the presence of 12–14% of polybutadiene or a 70/30 butadiene/styrene copolymer.

RM-SMA(T)—SMA(T) polymerized in the presence of 12–14% of polybutadiene or a 70/30 butadiene/styrene copolymer.

SMA(foam)—A foam of a 92% styrene/8% maleic anhydride polymer of specific gravity 0.05.

F-G Cloth—Glass fiber cloth

ABS—A commercial polymer comprising a diene rubber substrate grafted with a styrene/acrylonitrile copolymer superstrate and dispersed in a matrix of a styrene/acrylonitrile copolymer.

Alloy—A 50/50 weight percent blend of ABS with RM-SMA.

The strengths of the various laminates were determined using a variety of techniques. The FDI (Falling Dart Impace) test which used a 38 mm diameter dart is described in ASTM-D-1709; and the Gardner Impact test which used a 12.7 mm diameter dart is described in Cohen et al., "Materials Research and Standards". Volume 9, No. 5 pages 21–24 (1969).

The results obtained are given below in Table 1. In each case comparative data is given to show the strength of the laminate.

TABLE 1

| EXAMPLE | SAMPLE TESTED | THICKNESS mm | IZOD J/m. notch | FDI (J) | GARDNER |
|---|---|---|---|---|---|
| 1 | SMA/PVB/SMA | 1/0.5/1 | 190 | — | 7.9 |
| (c) | Glass | 3.1 | — | — | .1 |
| (c) | SMA | 2.0 | 27 | — | .1 |
| 2 | SMA(T)/PVB/SMA(T) | 1/0.5/1 | 190 | — | 7.9 |
| (c) | SMA(T) | 2.0 | 27 | — | .1 |
| 3 | RM-SMA/PVB/RM-SMA | 1.3/0.5/1.3 | 217 | 568 | 39 |
| (c) | RM-SMA | 2.5 | 103 | 13.6–20.4 | 8. |
| 4 | ABS/RM-SMA/PVB/RM-SMA | 0.25/2.5/0.5/2.5 | — | 73.8 | 39 |
| (c) | ABS/RM-SMA | 0.25/5 | — | 17.0–22.7 | 7.8 |
| 5 | RM-SMA/PVB/F.G. CLOTH/PVB/RM-SMA | 1.9/0.5/0.13/5/1.9 | 271 | — | 39 |
| (c) | RM-SMA | 5 | 9 | — | 2.2 |
| 6 | ALLOY/PVB/ALLOY | 2.5/0.5/2.5 | 401 | | 39 |
| (c) | ALLOY | 5 | 190 | | N28 |
| 7 | SMA(FOAM)/PVB/SMA(Foam) | 4.8/0.75/4.8 | 65 | — | 11.1 |
| (c) | SMA(FOAM) | 9.5 | approx. 0 | — | 0.5 |
| 8 | RM-SMA/SMA(FOAM)/PVB/SMA(FOAM)/RM-SMA | 0.25/4.8/0.75/4.8/0.25 | 114 | — | 16.7 |
| (c) | RM-SMA/SMA(FOAM) | 0.25/9.5 | approx. 0 | — | 0.5 |

The above Examples clearly show the great increase in impact as a result of laminating as described in the invention.

EXAMPLE 9

A sample of an RM-SMA/ABS laminate (2.5 mm/2.5 mm in thickness) was chromeplated on the ABS side using standard ABS plating conditions.

A laminate according to the invention comprising, in laminated sequence ABS/RM-SMA/PVB/RM-SMA (thickness-in mm 0.25/2.5 0.5/2.5 respectively) was also plated on the ABS side. The FDI of the laminate according to the invention was 54.2 J whereas that of the RM-SMA/ABS laminate could only reach 6.8 J.

Chrome plating is well known to reduce the impact properties of high-impact grades of plastics. The present invention therefore offers a way of overcoming this serious problem.

What is claimed is:

1. A laminate comprising:
   (A) at least one sheet comprising a copolymer formed by polymerizing from 55 to 97 parts by weight of a vinylaromatic monomer with from 45 to 3 parts by weight of an unsaturated dicarboxylic acid anhydride and from 0 to 20 parts by weight of copolymerizable monomer; laminated to
   (B) a sheet of polyvinylbutyral.

2. A laminate according to claim 1 in which the monomers of Component (A) are polymerized in the presence of a rubber having a glass transition temperature below 0° C. such that Component (A) comprises from 2 to 30 percent by weight of the rubber.

3. A laminate according to either of claims 1 and 2 in which Component (A) comprises from 5 to 15 percent by weight of a monomer selected from $C_1$ to $C_3$ alkyl methacrylates, acrylonitrile and methacrylonitrile.

4. A laminate according to any of claims 1 to 3 which is transparent.

5. A laminate according to any of claims 1 to 3 in which Component (A) is foamed.

6. A laminate according to any of claims 1 to 3 in which Component (B) is laminated between sheets of Component (A).

7. A laminate according to any of claims 1 to 3 in which the exposed surface of the Component A sheet is provided with an abrasion resistant coating.

8. A laminate according to any of claims 1 to 3 which comprises, in laminated sequence, layers of Component (B), Component (A) and a copolymer of styrene and acrylonitrile.

9. A laminate according to any of claims 1 to 3 in which Component (A) comprises up to 70 percent by weight of a copolymer of styrene and acrylonitrile polyblended with the copolymer of the vinylaromatic monomer and the unsaturated dicarboxylic acid anhydride.

10. A laminate according to any of claims 1 to 3 in which Component (A) comprises up to 70 percent by weight of ABS.

11. A laminate according to any of claims 1 to 3 in which Component (A) is laminated to an ABS Sheet.

12. A laminate according to any of claims 1 to 3 in which Component (A) is laminated to a metal-plated ABS sheet.

13. A laminate according to any of claims 1 to 3 in which Component (A) comprises glass fiber reinforcement.

14. A laminate according to any of claims 1 to 3 in which the polyvinyl butyral sheet is also laminated to a sheet selected from the group consisting of polymethylmethacrylate, polycarbonates, polyamides and polyethylene terephthalate.

15. A laminate according to any of claims 1 to 3 which comprises two or more sheets of Component (A) of different compositions.

16. A multilayer laminate structure comprising a sub-laminate according to any of claims 1 to 3.

* * * * *